(12) United States Patent
Kobrin

(10) Patent No.: US 7,278,790 B1
(45) Date of Patent: Oct. 9, 2007

(54) FIBER-OPTIC CABLE CONNECTOR

(75) Inventor: Eric L. Kobrin, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/384,532

(22) Filed: Mar. 20, 2006

(51) Int. Cl.
*G02B 6/38* (2006.01)
*G02B 6/36* (2006.01)

(52) U.S. Cl. .................... 385/85; 385/55; 385/58; 385/60; 385/70; 385/72; 385/73; 385/75; 385/76; 385/77; 385/78

(58) Field of Classification Search .......... 385/85, 385/139
See application file for complete search history.

(56) References Cited

U.S. PATENT DOCUMENTS

2002/0195123 A1   12/2002   Strait ........................ 134/8
2003/0202752 A1*  10/2003   Gall et al. ................. 385/61

* cited by examiner

*Primary Examiner*—Frank G. Font
*Assistant Examiner*—Ryan Lepisto
(74) *Attorney, Agent, or Firm*—Cantor Colburn LLP; Steven W. Roth

(57) ABSTRACT

Exemplary embodiments include an improved connector for a fiber-optic cable including: a fiber-optic conductor disposed in a center portion of the fiber-optic connector; one or more flexible end portions disposed on an outer portion of the fiber-optic connector; a swab disposed on an inner surface of at least one flexible end portion; wherein the swab contacts and cleans the fiber-optic conductor when the improved connector is attached to a receptacle.

10 Claims, 2 Drawing Sheets

FIBER-OPTIC CABLE CONNECTOR

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates generally to fiber-optic cables connectors and more specifically to fiber-optic cable connectors for protecting and cleaning the fiber optic cable.

2. Description of Background

Fiber-optic cable is very sensitive to dust and dirt at the contact points of the fiber-optic cable. Currently the method for keeping fiber-optic cable ends clean involves manually placing small caps on the ends of the fiber-optic cables when not they are not in use. These caps are easily lost and misplaced, so fiber-optic cables are frequently damaged by dust and dirt. Additionally, the very small diameter of many fiber-optic cables makes the cleaning of connector structures for connecting such cables together very difficult.

Swabs for use in the cleaning task must be very small in diameter in order to fit into the tiny openings in the connectors. This makes the manufacture of the swabs very difficult. Swabs to fit into openings as small as 1.25 mm to 2.5 mm have been developed; One, which is known, has a tiny knitted sleeve fitted over the end portion of a swab handle. Other small swabs use tiny knitted strips wound around the tip of the swab handle to form the swab body. This swab configuration is very difficult to scale-down for use in cleaning the very small fiber-optic openings to which this invention is directed.

Accordingly, it is an object of the invention to alleviate the foregoing problems and provide a relatively inexpensive system and method for protecting and cleaning fiber-optic connectors and cables.

SUMMARY

Exemplary embodiments include an improved connector for a fiber-optic cable including: a fiber-optic conductor disposed in a center portion of the fiber-optic connector; one or more flexible end portions disposed on an outer portion of the fiber-optic connector; a swab disposed on an inner surface of at least one flexible end portion; wherein the swab contacts and cleans the fiber-optic conductor when the improved connector is attached to a receptacle.

Exemplary embodiments also include a system including: a fiber-optic cable; an improved connector slideably disposed on a distal end of the fiber-optic cable, wherein the improved connector includes: a fiber-optic conductor disposed in a center portion of the fiber-optic connector; one or more flexible end portions disposed on an outer portion of the fiber-optic connector; and a swab disposed on an inner surface of at least one flexible end portion; wherein the swab contacts and cleans the fiber-optic conductor when the improved connector is slid along the axis of the fiber-optic cable.

Exemplary embodiments further include A fiber-optic connector for a fiber-optic cable including: a fiber-optic conductor disposed in a center portion of the fiber-optic connector; one or more flexible end portions disposed on an outer portion of the fiber-optic connector; an actuator disposed in the fiber-optic connector in operable communication with at least one flexible end portion; and a swab disposed on an inner surface of at least one flexible end portion, wherein the swab contacts and cleans the fiber-optic conductor when the improved connector is attached to a receptacle, wherein the improved connector is slideably disposed on the fiber-optic cable, the improved connector is configured to properly align the fiber-optic conductor to a receptacle, and the flexible end portions cover the fiber-optic conductor when the fiber optic cable is not is connected to a receptacle.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which provides a connector for a fiber-optic cable that protects and cleans the fiber-optic cable during its normal operation.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Figure 1:
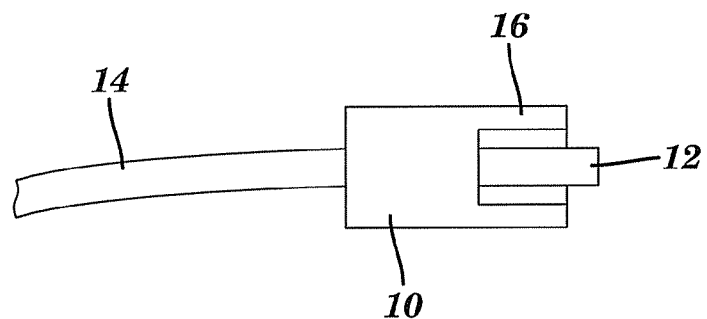
FIG. 1 illustrates one example of a traditional connector for a fiber-optic cable.

Fiber-optic cable connectors are made in many different forms. FIG. 1 illustrates a traditional fiber-optic connector 10, which accurately aligns a fiber-optic conductor 12 of the fiber-optic cable 14. Each fiber-optic cable connector 10 has a hollow cylindrical end portion 16, which fits into a cylindrical end portion of a receptacle. In one embodiment, the end portion of the fiber-optic conductors 12 extends into and beyond the hollow cylindrical end portion 16 along its central axis. In other embodiments, the end portion of the fiber-optic conductor 12 may not extend beyond the hollow cylindrical end portion 16.

Figure 2:
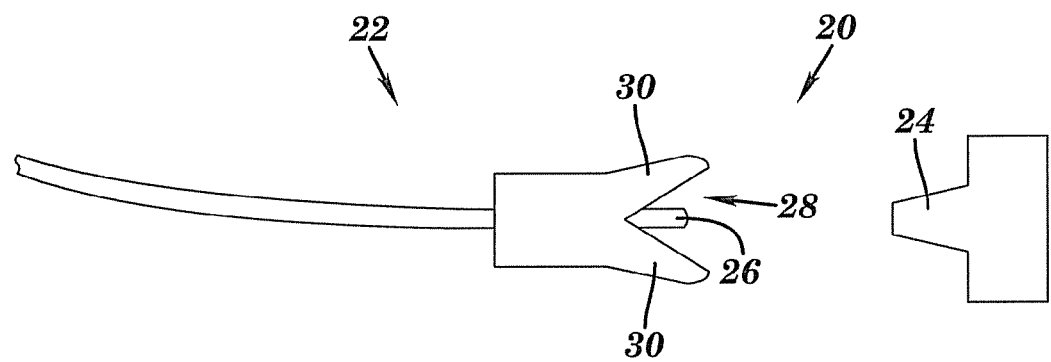
FIG. 2 illustrates one example of an improved connector for a fiber-optic cable.

Referring now to FIG. 2, an improved connector 20 is illustrated. The improved connector 20 covers the end of a fiber-optic cable 22 when the fiber-optic cable 22 is not in use. When the fiber-optic cable 22 is being inserted into a receptacle 24, the improved connector 20 slides open and exposes the end of the fiber-optic conductors 26. During the process of opening the improved connector 20, through the use of swab 28, cleans the fiber-optic conductors 26. As shown, the swab 28 may be disposed on the inner surface of the improved connector 20 such that it contacts the fiber-optic conductor 26 when the improved connector 20 opens. In one embodiment, the swab 28 may be a small soft cloth used to remove dust and dirt from the end of the fiber-optic conductor 26.

In one embodiment, the improved connector 20 includes a one or move flexible end portions 30 that each may have a swab 28 disposed on the inner surface of the flexible end portions 30. The flexible end portions 30 are designed to separate from one another and expose the end of the fiber-optic conductor 26 when the improved connector 20 contacts the receptacle 24. As the flexible end portions 30 separate, the swabs 28 contact the end of the fiber-optic conductor 26 and remove any dust or dirt from the fiber-optic conductor 26. When the fiber-optic cable is 22 is disengaged from the receptacle 24, the flexible end portions 30 of the improved connector 20 return to their collapsed state. In the process of returning to their collapsed state, the swabs 28 disposed on the inner surface of the flexible end portions 30 contact and clean the end of the fiber-optic conductor 26. Additionally, when the fiber-optic cable 22 is not in use the flexible end portions 30 of the improved connector 30 collapse to cover the fiber-optic conductor 26, which prevents the fiber-optic conductor from becoming damaged or dirty.

In another exemplary embodiment, the improved connector 20 may be slideably disposed on the fiber-optic cable 22. The improved connector 20 can be slid axially along the fiber-optic cable 22 to selectively expose the fiber-optic conductor 26. Each time the improved connector 20 is moved across the fiber-optic conductor 26, the swab 28 disposed on the inner surface of the improved connector 20 contacts and cleans the exposed end of the fiber-optic conductor 26. The range of axial movement along the fiber-optic cable 22 of the improved connector 20 may be limited. For example, the improved connector 20 may be designed such that it may only be moved about the end of the fiber-optic cable 22 to selectively expose the fiber-optic conductor 26.

Figure 3A:
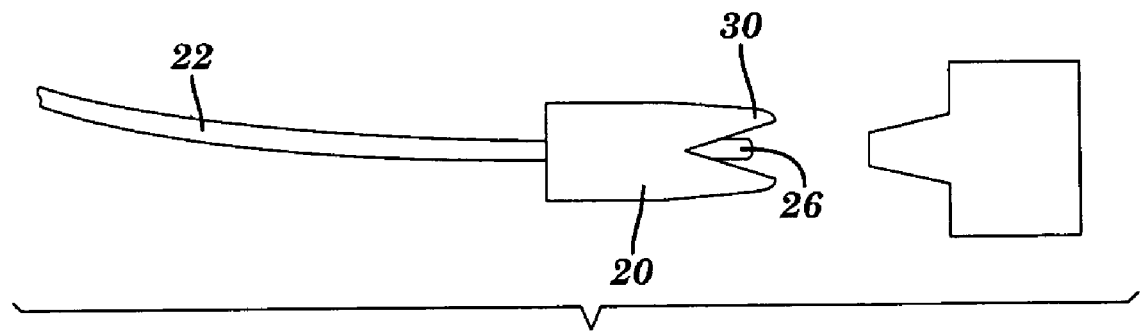
FIGS. 3a-3c illustrate the use of the improved connector of FIG. 2 for connecting a fiber-optic cable to a receptacle.
Figure 3B:
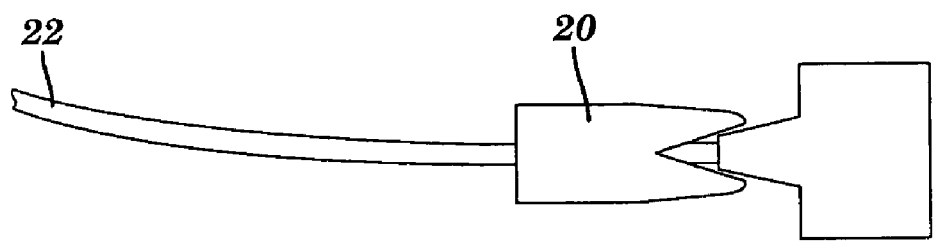
Figure 3C:
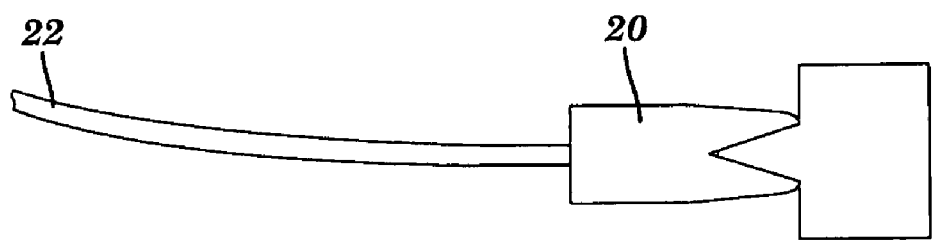

Turning now to FIGS. 3a-3c, a series of images illustrate the use of the improved connector 20. FIG. 3a illustrates the fiber-optic cable 22 including the improved connector 20 in its collapsed state approaching the receptacle 24. FIG. 3b illustrates the fiber-optic cable 22 in the process of attaching to the receptacle 24. As is shown, the flexible portions 30 of the connector 20 are separated to expose the fiber-optic conductor 26. The flexible portions 30 may be opened due to their contact with the receptacle or due to an axial movement of the improved connector 20. Alternatively, the flexible portions 30 may be spring biased closed and opened by exerting radial pressure on the rearward end of the connector 20. For example, the rear portion of the improved connector 20 may include an actuator that is designed to open the flexible end portions 30 in response to radial pressure. In the absence of a radial pressure the actuator keeps the flexible end portions 30 in the collapsed state to protect the fiber-optic conductor 26. As the flexible portions 30 of the improved connector 20 open exposing the fiber-optic conductor 26 a swab 28 disposed on an inner surface of the flexible portions 30 contacts and cleans the fiber-optic conductor 26. FIG. 3c illustrates the fiber-optic cable engaged with the receptacle 24.

For purposes of illustration, the improved connectors 20 depicted in the above referenced figures have been simplified. It will be recognized by one of ordinary skill in the art that the actual design of the improved connector 20 would include a system for the improved connector 20 and the receptacle 24 to snap together, similar to that used in current fiber-optic connectors. In an exemplary embodiment, the swab 28 disposed on the inner surface of the improved connector 20 would not contact the receptacle 24 during operation of the improved connector 20.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A fiber-optic connector for a fiber-optic cable comprising:
    a fiber-optic conductor disposed in a center portion of the fiber-optic connector;
    one or more flexible end portions disposed on an outer portion of the fiber-optic connector;
    a swab disposed on an inner surface of at least one flexible end portion;
    wherein the swab contacts and cleans the fiber-optic conductor when the improved connector is attached to an external receptacle; and
    wherein the inner surface of the one or more flexible end portions directly secures the fiber-optic connector via the external receptacle.

2. The fiber-optic connector of claim 1, wherein the improved connector is slideably disposed on the fiber-optic cable.

3. The fiber-optic connector of claim 2, wherein the improved connector is configured to properly align the fiber-optic conductor to the external receptacle.

4. The fiber-optic connector of claim 3, wherein a swab is disposed on the inner surface of each flexible end portion.

5. The fiber-optic connector of claim 4, wherein the flexible end portions cover the fiber-optic conductor when the fiber optic cable is not connected to the external receptacle.

6. A system comprising:
    a fiber-optic cable;
    an improved connector slideably disposed on a distal end of the fiber-optic cable, wherein the improved connector comprises:
        a fiber-optic conductor disposed in a center portion of the fiber-optic connector;
        one or more flexible end portions disposed on an outer portion of the fiber-optic connector; and
        a swab disposed on an inner surface of at least one flexible end portion;
        wherein the swab contacts and cleans the fiber-optic conductor when the improved connector is slid along the axis of the fiber-optic cable; and
    wherein the inner surface of the one or more flexible end portions directly secures the fiber-optic connector via an external receptacle.

7. The system of claim 6, further comprising the external receptacle configured to connect to the improved connector and properly align the fiber-optic conductor.

8. The system of claim 7, wherein a swab is disposed on the inner surface of each flexible end portion.

9. The system of claim 8, wherein the flexible end portions cover the fiber-optic conductor when the fiber optic cable is not is connected to the external receptacle.

10. A fiber-optic connector for a fiber-optic cable comprising:
- a fiber-optic conductor disposed in a center portion of the fiber-optic connector;
- one or more flexible end portions disposed on an outer portion of the fiber-optic connector;
- an actuator disposed in the fiber-optic connector in operable communication with at least one flexible end portion; and
- a swab disposed on an inner surface of at least one flexible end portion, wherein the swab contacts and cleans the fiber-optic conductor when the improved connector is attached to an external receptacle, wherein the improved connector is slideably disposed on the fiber-optic cable, the improved connector is configured to properly align the fiber-optic conductor to the external receptacle, and the flexible end portions cover the fiber-optic conductor when the fiber optic cable is not connected to the external receptacle; and wherein the inner surface of the one or more flexible end portions directly secures the fiber-optic connector via an external receptacle.

* * * * *